12
3,462,532
CONTROLLING GASTROPODS WITH NICOTIN-
ANILIDE OR ALKYLARYL NICOTINAMIDE
GASTROPODICIDES
John L. Hardy, Midland, Mich., assignor to The Dow
Chemical Company, Midland, Mich., a corporation of
Delaware
No Drawing. Continuation-in-part of application Ser. No.
563,032, July 6, 1966. This application Aug. 28, 1967,
Ser. No. 663,528
Int. Cl. A01n 9/22, 17/00
U.S. Cl. 424—266                                7 Claims

ABSTRACT OF THE DISCLOSURE

Gastropods and their ova are controlled by the application of a gastropodicidal amount of nicotinanilide or an alkylaryl nicotinamide to the gastropods, their ova and their habitats.

---

This application is a continuation-in-part of my copending application Ser. No. 563,032, filed July 6, 1966, now abandoned, which earlier application was, in turn, a continuation-in-part of application Ser. No. 516,101, filed Dec. 23, 1965, now abandoned.

The present invention is directed to a method for controlling gastropods and their ova and particularly to the use of certain nicotinanilide and aralkyl nicotinanilide compounds as gastropodicides.

Gastropods, members of the class Gastropoda, cause considerable damage to plants as well as being vectors for many animal and human parasites such as Fasciola species, Clonorchis species, Opisthorchis species, Schistosoma species, etc. Thus various health agencies as well as farmers and horticulturists are interested in methods of killing and controlling gastropods and gastropod eggs or ova with a minimum effect upon the flora and other fauna found in the gastropod's environment. Such flora and fauna include terrestrial and aquatic plants and warm-blooded animals, and fish and other forms of aquatic life.

The method of the present invention comprises contacting gastropods and/or their ova and/or their habitats with a gastropodicidal amount of a compound corresponding to the formula

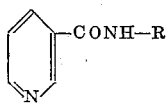

In the present specification and claims, R represents a member of the group consisting of phenyl, 3-chlorophenyl, 4 - chlorophenyl, 4 - bromophenyl, 3,4 - dichlorophenyl, 3 - trifluoromethylphenyl, 4 - trifluoromethylphenyl, 4 - methylphenyl, 3 - methylphenyl, 3 - fluorophenyl, 4 - fluorophenyl, 3 - methylthiophenyl, 4 - methylthiophenyl, 4 - methoxyphenyl, 3 - n - butoxyphenyl, 4 - ethoxyphenyl, 4 - dimethylaminophenyl, 3 - chloro - 4 - fluorophenyl, 3 - fluoro - 4 - methylphenyl, benzyl, phenethyl and 4-chloro-2-nitrophenyl. The preferred embodiments of the present invention are those compounds wherein R represents phenyl, 3 - trifluoromethylphenyl, 3 - chlorophenyl, 4 - bromophenyl, 3 - chloro - 4 - fluorophenyl and 3 - fluoro-4-methylphenyl. The nicotinanilides and arylalkyl nicotinamides of the present invention shall hereinafter be referred to generically as "nicotinamides."

In carrying out the present invention, any technique may be used so long as a gastropod is contacted with a toxicant of the present invention at a concentration sufficient that the gastropod dies as a result of the said contact. Also, the exact time of exposure being dependent upon a variety of factors including water temperature, the particular type of gastropods to be exterminated, expected or known duration of gastropod contact with treated water, nature and content of organic matter in, or in contact with, water if any; incidence of sunlight, daylight length and other seasonal factors. In accomplishing the purpose of the present invention, the toxicant compound can be applied to the gastropods habitat and/or food supply so that the gastropod ingests a gastropodicidal amount of the toxicant compound. When employing the toxicant compound of the present invention to kill gastropod ova the toxicant is applied to the ova or their habitat in an ovicidal amount. When it is desired to depopulate an area of gastropods for an extended period of time, the toxicant compound or compounds can be applied at intervals in order to control any population which has become established subsequent to the preceding application. It may also be desirable to maintain the toxicant at a continuous, low gastropodicidal level of concentration. Such low levels are conveniently maintained in bodies of water by dispersing the toxicant in water in the form of pellets prepared with water-insoluble, or slowly-soluble, carrier material which disperses, dissolves, or yields the toxicant slowly by leaching to the water over a period of time. Certain of the gastropods such as some of the snails are dependent upon a body of water. A gastropod is regarded herein as being dependent upon a body of water if it is aquatic or amphibious.

Concentrations to be employed in water vary, depending upon a variety of factors including water temperature, the particular type of gastropods to be exterminated; expected or known duration of gastropod contact with treated water, nature and content of organic matter in, or in contact with, water if any; incidence of sunlight, daylight length and other seasonal factors. In general, good control of gastropods and gastropod ova are obtained in still water when a concentration of from about 2 to about 5 parts toxicant per million parts water, all by weight, are employed. When it is desired to obtain a quick kill of aquatic snails and their eggs as may be necessary in rivers and streams with moderate to rapid current, higher concentrations up to as high as 100 or 500 parts toxicant per million parts water, by weight, can be employed. When a quiescent body of water is to be treated, under relatively farm water temperature conditions (water about 80° F. at the surface, for example) and prolonged contact is possible, concentrations maintained as low as .5 part toxicant per million parts water can be used, with contact durations as great as several weeks. However, when the preferred group of nicotinamides are employed in such operations, concentrations as low as 0.2 part per million by weight are gastropodicidal, while a concentration as low as 0.01 part per million by weight of nicotinanilide is ovicidal. For best results in obtaining good kills of gastropod ova it is preferred to employ the nicotinamide toxicants at a concentration of at least 1 part per million by weight.

Under field conditions, in still water, concentrations typically employed are on the order of 2 parts of toxicant per million parts of water, all by weight. Where toxicity to other animal forms is not a factor, higher concentrations up to 10 or more may be employed. Concentration as high as 500 parts per million can be employed, however, such high concentrations are not usually necessary. Such concentrations give good control of gastropods and/or their ova.

In general, methods of civil and hydraulic engineering can be applied for obtaining sufficiently accurate estimates of water volumes and flows in natural bodies of water in order to calculate proper dosages of toxicants. Moreover, most aquatic gastropods, even truly aquatic fresh water snails and their eggs tend to live in only shallow waters or in the upper parts and near the shores of deeper water: hence, uniform dispersion of the toxicant throughout the entire body of water is not essential.

When it is desired, as it often is, to effect control of such gastropods and their ova with a minimum of side effects upon other components of the entire biota, and in particular to avoid harm to fish, littoral plants, warm-blooded animals, and the like, then the combination of concentration of toxicant and exposure time, will be chosen to represent a minimum gastropodicidal dosage. In standing bodies of water with little or no inflow and outflow, it is possible to control the concentration, but duration of exposure will depend upon time elapsed until reaction and precipitation, together with biodegradation and other factors, have detoxified the water; this will, in turn, depend upon many local natural factors. In running bodies of water of which the current moves at a known rate, the duration of exposure at an initial site can be controlled with a fair degree of accuracy.

Known techniques for the chemical treatment of bodies of water can be used such as constant flow or metering devices, or aerial application or application from a small boat, making use of the known solubility, dispersibility, and the like, of the toxicant substance employed.

When, through tidal action, drainage, control of dam spillways and the like, the gastropods and/or their eggs are exposed, the wet, exposed land bearing a gastropod population and/or egg masses can be sprayed or dusted with formulations prepared as for routine agricultural application. The toxicant compounds of the present invention can also be applied to plants and plant parts where the gastropods may ingest the toxicant.

More particularly, nicotinamide toxicants are readily dispersible in water and can be distributed in, or over the water, wet land or plants to be treated, in the form of a dust of either the pure toxicant or the toxicant admixed with a diluent or adjuvant. Such diluent solid can be an inert substance such as infusorial earth, clay, talc, chalk, wood, flour, or the like. The toxicant can be distributed in this kind of substance by grinding toxicant and diluent or adjuvant together, by grinding them separately and admixing, or by dispersing the nicotinamide toxicant in a liquid which is then dispersed in the solid with subsequent grinding after the liquid has been evaporated, if desired.

As carrier in coarsely particulate form adapted for slow release of toxicant a porous fritted glass, or a porous fired clay can be used, into which by solvent solution the toxicant is dispersed, the solvent being thereafter removed by vaporization. Other such carriers are known. In addition, the toxicant materials of the present invention can be employed in granular compositions prepared in accordance with known granulating techniques to provide for the release of the toxicant over a prolonged period of time. Such known granulating techniques employ vegetable gums, shellac, etc.

Also the toxicant can be dissolved in water or organic solvent; in either case, but especialy in the case of organic solvent, a wetting agent as emulsifying dispersant can be added. Such preparations are adapted for prompt and often spontaneous dispersion when added to water, as an emulsion of toxicant in water. For convenience in measuring out an employed amount, such preparation can be diluted with further organic liquid, or with water; or for convenience in shipment and storage, can be prepared as a concentrate in which the contained amount of toxicant approaches the theoretical maximum for the solvent-dispersant system employed. At dam spillways and the like, such high concentrations can be directly employed, relying upon water turbulence for mixing.

The quantity of toxicant per unit of preparation is not critical; so long as the preparation can be employed to distribute the toxicant in gastropodicidal amounts in the body of water to be treated, good results are obtained. The concentration of toxicant in liquid concentrate compositions generally is from about 1 to 50 percent by weight. Concentrations up to 95 percent by weight oftentimes are conveniently employed. In dusts, the concentration of the toxicant can be from about 1 to 10 percent by weight. In compositions to be employed as concentrates, the toxicant can be present in a concentration of from 5 to 98 percent by weight.

The following examples are merely illustrative and are not intended to be limiting.

Example 1

A toxicant composition is prepared by combining 6 percent by weight of the nicotinamide compound, 3 percent Nacconal NR (alkyl aryl sulfonate) and 3 percent Daxad (a polymerized sodium salt of a substituted benzoid alkyl sulfonic acid) and 88 percent water and ball-milling the resultant mixture to prepare a water dispersible liquid concentrate composition. Another mixture is prepared by ball-milling the same amounts of Nacconal NR and Daxad plus 94 percent by weight of water to provide a check composition containing no toxicant compound. These compositions are employed for the treatment of snails (Physa Gyrinia Say, *Stagnicola palustris* and *Helisoma trivolvis*) growing in a series of small tanks containing an aqueous environment suitable for maintenance and growth of the snails. In such operations the nicotinamide liquid concentrate is added to the tanks in an amount sufficient to expose the snails to the concentrations of 2 parts by weight of the nicotinamide toxicant per million parts by weight of water. Other tanks are treated with the same amount of the check composition containing no toxicant. The snails are exposed to the environments for a period of 24 hours. Thereafter they are removed from the environments, rinsed, and placed in tanks containing an aqueous environment sufficient for the maintenance and growth of the snails. Forty-eight hours later mortality counts are made in order to determine the percent kill. As a result of such operations, it was found that nicotinanilide, 3'-chloronicotinanilide, 4'-chloronicotinanilide, 4'-methylnicotinanilide, 4'-methoxynicotinanilide each gave 100 percent kills of snails at the dosage of 2 parts per million by weight. Observations of the checks showed the snails treated with the described check composition to be viable and normal in all respects.

Example 2

Two-day-old egg masses of *Stagnicola palustris* were exposed to various of the toxic compounds of the present invention as the sole toxic constituents in exactly the same manner as employed in Example 1 except that the toxicant was employed at a concentration of 0.5 part per million by weight. Following the 24 hour exposure to the toxicant the egg masses were rinsed and placed in an aqueous environment suitable for the hatching of eggs. Other egg masses were treated as checks as described in Example 1. Seven days after the eggs were exposed to the toxicant all eggs were observed to determine the percent kill. In such operations, a nicotinamide composition prepared as described in Example 1 gave 100 percent kill of the eggs when employed at a concentration of 0.5 part per million by weight. The eggs in the check operation hatched normally giving a heavy yield of viable organisms.

Example 3

In further representative examples, snails of the species *Australorbis glabratus*, which is known to be a vector for schistosomiasis, were treated with the toxicant material. In such operations, each of the toxicant compounds 3'-trifluoromethylnicotinanilide, 3',4'-dichloronicotinanilide, 4'-fluoronicotinanilide and 4'-chloronicotinanilide, was separately dispersed in water in an amount sufficient to provide toxicant compositions containing one of the toxicant compounds at a concentration of 1 part per million by weight. Into these aqueous toxicant-containing compositions were placed nine-week old (9–12 mm.)

*Australorbis glabratus* snails. The snails were exposed to the toxicant compositions for 24 hours without aeration or food. During the exposure period the temperature of the aqueous toxicant compositions was maintained at 28±0.5° C. Following the exposure period the snails were rinsed with water and placed in water suitable for the maintenance of snails for a recovery period of 48 hours. During the recovery period normal food and aeration are provided. Aqueous compositions containing 4'-chloronicotinanilide, 3'-trifluoromethylnicotinanilide, 3', 4'-dichloronicotinanilide, or 4'-fluoronicotinanilide at a concentration of 1 part per million by weight gave 100 percent kills of the snails exposed to such concentrations.

Example 4

Snails of the species *Australorbis glabratus* which is known to be a vector for schisosomiasis were treated with various nicotinanilides as the sole toxicant material. In such operations 3 milligrams of the toxicant material was dissolved in 3 milliliters of acetone or if the compound is insoluble in acetone in 3 milliliters of a 50/50 acetone/water mixture. An aliquot of the toxicant solution was then removed and dispersed in water in an amount sufficient to provide aqueous compositions containing the toxicant compound at a concentration of 0.5 part per million by weight. Into these aqueous, toxicant-containing compositions were placed 9 week old (9–12 mm.) *Australorbis gladbratus* snails. The snails were exposed to the toxicant compositions for 24 hours without aeration or food. During the exposure period, the temperature of the aqueous toxicant compositions were maintained at 28°±0.5° C. Following the exposure period, the snails were rinsed with water and placed, for a recovery period of 48 hours, in water suitable for the maintenance of snails. During the recovery period normal food and aeration were provided. In such operations 3',4'-dichloronicotinanilide, 4'-chloronicotinanilide, 4'-fluoronicotinanilide, 3'-methylnicotinanilide, 3'-butoxynicotinanilide, N-benzynicotinamide and N-phenethylnicotinamide each, when employed as the sole toxicant material gave complete kills of the test snails when employed at concentrations of 0.5 part per million by weight.

In a check operation, an amount of acetone equivalent to five times the amount of acetone employed to dissolve the toxicant compound is dispersed in water. No toxicant compound is present in the acetone-water mixture. *Australorbis glabratus* snails are exposed to the acetone-water mixture in exactly the same manner as the snails are exposed to the toxicant composition as described in the preceding paragraph. Following the exposure to the acetone-water mixture the snails are further treated exactly as the snails exposed to the toxicant compound. This procedure is used as a check in order to ascertain what, if any, gastropod mortality is caused by the acetone. It is ascertained that the acetone is without evident effect of any kind upon snails of the genus Australorbis. This is taken to indicate that in the present example, toxic effects upon snails can be assumed to be caused only by the toxicant compound tested.

Example 5

Nicotinanilide, 3'-chloronicotinanilide, 3'-trifluoromethylnicotinanilide, 3'-chloro-4'-fluoronicotinanilide and 3'-fluoro-4'-methylnicotinanilide were each employed as the sole toxicant constituent at a concentration of 0.25 part per million by weight in exactly the same manner as employed in Example 4. In such operations, nicotinanilide, 3-trifluoromethylnicotinanilide, 3'-chloro-4'-fluoronicotinanilide, 3'-fluoronicotinanilide and 3'-fluoro-4'-methylnicotinanilide each gave 100 percent kills of the snails tested.

Example 6

In still further operations, 4'-ethoxynicotinanilide and 4'-dimethylaminonicotinanilide each gave 100 percent kill of Australorbis snails when employed as the sole toxicant at a concentration of 1 part per million by weight in exactly the same manner as described in Example 4.

Example 7

Aqueous compositions containing 3'-butoxynicotinanilide, 3'-chloro-4-fluoronicotinanilide or 3'-fluoro-4'-methylnicotinanilide as the sole toxicant constituent were prepared as described in Example 4. Into these aqueous toxicant-containing compositions were placed 1 to 5 day old egg masses from the snail *Australorbis glabratus*. The egg masses were exposed to the toxicant compositions for 24 hours without aeration or food. During the exposure period, the temperature of the aqueous toxicant composition was maintained at 28°±0.5° C. Following the exposure period the eggs were rinsed with water and placed in water suitable for the maintenance and hatching of eggs for a period of three weeks. At the end of this period the eggs were observed to determine the percentage of eggs hatching. In such operations, 3'-chloro-4'-fluoronicotinanilide, 3'-fluoro-4'-methylnicotinanilide and 3'-butoxynicotinanilide each, when employed as the sole toxic constituent gave 100 percent kill of the snail eggs at a concentration of 100 parts per million by weight.

Example 8

When the procedure of Example 7 was repeated using nicotinanilide as the sole toxicant, 100 percent kill of the snail eggs were observed at a concentration of 0.01 part par million by weight.

The nicotinanilide compounds of the present invention are prepared by known procedures as, for example that of Klosa, G., J. Prakt. Chem., 19:45 (1952). In a representative known procedure equimolar proportions of nicotinic acid and aniline or a suitably substituted aniline are contacted with phosphorus oxychloride in the presence of benzene. The reaction mixture thus formed is then heated at the boiling temperature and under reflux for from one to two hours. Thereafter, the product which precipitates in the reaction mixture as a crystalline solid is collected by such conventional procedures as decantation or filtration.

What is claimed is:

1. The method which comprises contacting gastropods and their ova and their habitats with a gastropodicidal amount of a toxicant compound corresponding to the formula

wherein R is a member of the group consisting of phenyl, 3-chlorophenyl, 4-chlorophenyl, 4-bromophenyl, 3,4-dichlorophenyl, 3-trifluoromethylphenyl, 4-trifluoromethylphenyl, 4-methylphenyl, 3-methylphenyl, 3-fluorophenyl, 4-fluorophenyl, 3-methylthiophenyl, 4-methylthiophenyl, 4-methoxyphenyl, 3-n-butoxyphenyl, 4-ethoxyphenyl, 4-dimethylaminophenyl, 3-chloro-4-fluorophenyl, 3-fluoro-4-methylphenyl, benzyl, phenethyl and 4-chloro-2-nitrophenyl.

2. The method claimed in claim 1 wherein the contacting is carried out by dispersing the toxicant in the body of water in which the gastropod or gastropod ova are dependent.

3. The method claimed in claim 2 wherein the toxicant is supplied in an amount sufficient that the water contains at least 0.5 part by weight of toxicant per million parts by weight of water.

4. The method claimed in claim 1 wherein R represents phenyl and the toxicant employed corresponds to nicotinanilide.

5. The method claimed in claim 1 wherein R represents phenyl, 3-trifluoromethylphenyl, 3-chlorophenyl, 3-chloro-4-fluorophenyl and 3-fluoro-4-methylphenyl.

6. The method claimed in claim 5 wherein the toxicant is supplied in an amount sufficient that the water contains at least 0.2 part by weight of toxicant per million parts by weight of water.

7. The method claimed in claim 1 wherein R represents phenyl and the toxicant is supplied in an amount sufficient that the water contains at least 0.01 part by weight of toxicant per million parts by weight of water.

References Cited

Nolan et al.: Results of Laboratory Screening Tests of Chemical Compounds for Molluscicidal Activity, An. J. Trop., Med. Hyg., 2:716–752 (1953).

LEWIS GOTTS, Primary Examiner

S. K. ROSS, Assistant Examiner

U.S. Cl. X.R.

260—295.5